UNITED STATES PATENT OFFICE.

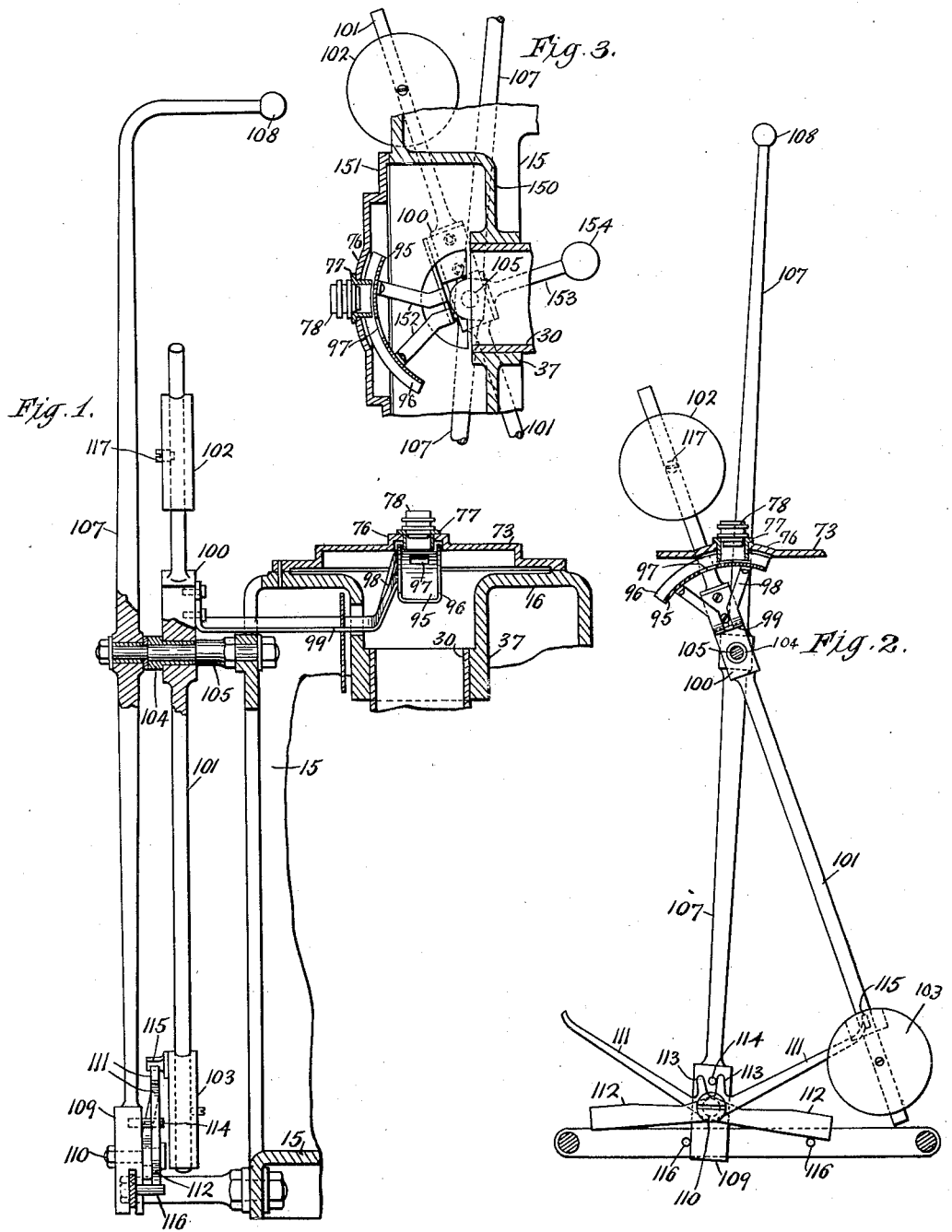

JOHN SWINSCOE, OF BALTIMORE, MARYLAND, ASSIGNOR TO THE CROWN CORK AND SEAL COMPANY OF BALTIMORE CITY, OF BALTIMORE, MARYLAND, A CORPORATION OF MARYLAND.

CAMERA-SHUTTER.

1,393,983.  Specification of Letters Patent.  Patented Oct. 18, 1921.

Application filed September 11, 1917. Serial No. 190,694.

*To all whom it may concern:*

Be it known that I, JOHN SWINSCOE, a citizen of the United States, residing at Baltimore and State of Maryland, have invented certain new and useful Improvements in Camera-Shutters, fully described and represented in the following specification and the accompanying drawings, forming a part of the same.

This invention relates to photographic lens shutters and operating means therefor.

In the use of certain types of cameras, it has been found that the shutters and their operating means are subject to certain objections. For example, they include more or less delicate and complicated mechanisms and they are liable to get out of order easily. It has also been found in the use of cameras, particularly of the so-called step and repeat type, in which marked uniformity of exposure is desired, that the shutters and shutter operating means available are lacking in adjustability and uniformity.

It is the principal object of the present invention to provide a shutter and shutter operating means comprising a structure which is simple, rugged and compact and such that adjustment may readily be made for variations of exposure, and at the same time making possible a high degree of uniformity in successive exposures for a given adjustment.

With this general object in view the invention consists in the combinations, details of construction and arrangements of parts, which will first be described in connection with the accompanying drawing, and then more particularly pointed out.

In the drawing,—

Figure 1 is a view partly in side elevation and partly in vertical section of a photographic lens shutter and its operating means constructed in accordance with the invention;

Fig. 2 is a view in vertical cross section with parts removed, showing the shutter mechanism more or less diagrammatically; and Fig. 3 is a vertical sectional view of a modification, showing the shutter and its operating mechanism adapted to a horizontal lens.

Referring to the drawing, in the exemplification here shown, there is provided a frame or support having upright portions 15 and a cross piece 16. This cross piece has a cylindrical portion 37 which may support a sleeve-like mount 30 for an object holder or the like. Mounted on the frame cross piece 16 is a lens support 73 having a central shouldered boss 76 into which is driven a shouldered bushing 77. The lens, in the present embodiment, is carried by a lens mounting 78 located in the bushing 77. It will be understood that a plate holder and other camera parts may be associated with the lens in any suitable manner.

A shutter is provided for normally shutting off the light rays from the lens, and in structures embodying the invention to the best advantage, the shutter will be capable of exposure adjustment. Although capable of various constructions, the shutter illustrated is a plate arranged to slide across the lens and having an opening in alinement with the lens to permit passage of the light rays and consequent exposure as the shutter is operated. As shown, the shutter includes a flat arcuate plate 95 having associated therewith upturned edges 96 which enter suitable spaces formed in the lens support, as appears in Fig. 1, the shutter being held close to the lens mounting member 78. Located in the arcuate plate 95 is a rectangular opening 97 arranged to cross the lens axis as the shutter moves one way or the other across the lens. As the character of exposure varies with the shutter opening 97, exposure may be adjusted by substituting shutter plates having different sized openings.

Means is provided for operating the shutter, and in structures embodying the invention to the best advantage the shutter is gravity operated. Although capable of various constructions, in the form shown the shutter is carried by two arms 98 merging into a single arm 99 secured to a boss 100 formed on a compound pendulum 101 having upper and lower weights 102, 103. To pivot the pendulum, the boss is journaled on a sleeve 104 mounted on a pin 105 carried by the main frame. It will be seen that as the pendulum swings one way or the other, the shutter will be operated to carry the opening across the lens, or, in other words, each swing of the pendulum opens the shutter and permits an exposure. It is noted that the shutter opening and shutter are so arranged that the opening crosses the lens as the pendulum attains approximately its maximum velocity. As gravity and the friction of the parts may be considered constant, the successive exposures for a given adjustment of the various elements involved are substantially uniform.

The invention includes means for locking the pendulum against movement and for releasing the locking means to permit the pendulum to swing to open and then close the shutter and in structures embodying the invention to the best advantage, the locking means will be automatically operated at each stroke of the pendulum, thereby to lock the shutter after each exposure. Although capable of various constructions, in the form shown, journaled on a bushing on the stud 105 is an operating member comprising a long rod 107 having a handle 108. At its lower end the rod 107 has an enlarged portion or foot 109 which carries a pivot pin 110 on which are mounted two arms 111 having weighted portions 112. These arms are oppositely disposed and the inner one is bent outwardly so their ends lie in the same plane, as appears in Fig. 1. Each arm has an upwardly extending lug 113 and the weighted portion is so arranged as to tend to swing the lug in against a stop pin 114 carried by the foot of the rod 107.

When the pendulum is raised, as shown, for example, in Fig. 2, its tendency is to swing downwardly. To prevent this movement and the resulting operation of the shutter, the lower weight 103 of the pendulum carries a stop member 115 adapted to be engaged by the curved ends of the arms 111. The weight of the pendulum presses against the arm 111 and through the engagement of the lug 113 with the pin 114 holds the foot of the rod 107 against a stop pin 116. The parts are therefore locked against movement. To release the lock to permit the shutter to operate, the operating rod 107 is swung on its pivot, as, for example, with the top moving to the left as viewed in Fig. 2, thus throwing the foot to the right. During the first part of this movement, the right hand arm 111 is pushed against the lower weight of the pendulum, and rod and pendulum move together to the right. As soon, however, as the weighted portion 112 of the arm 111 strikes the left hand stop pin 116, the arm is tripped to swing its end out of contact with the lug 115, thus releasing the pendulum and allowing it to swing on its pivot in the ordinary manner of a compound pendulum. Meanwhile the foot 109 of the operating rod has moved over to a position against the right hand stop pin 116. The arms 111 and the pendulum are so arranged that the pendulum swings somewhat beyond the end of the arms. Thus, in the operation being described, the pendulum swings to the left until somewhat beyond the end of the left hand arm 111 which, meanwhile, under the influence of its weighted end 112, has been swung up until its lug 113 strikes the stop pin 114. This positions the arm for its end to engage the lug 115 as the pendulum starts its return stroke. This engagement locks the parts again in a position just the opposite of that shown in Fig. 2 and they remain locked until the rod 107 is again shifted.

Means is provided for adjusting the speed of the shutter movement, and in structures embodying the invention to the best advantage, this is accomplished by inherently regulating the stroke of the pendulum. Although capable of a wide range of construction, in that illustrated, the upper weight 102 is slidable on the pendulum shank, being secured in place by a set screw 117. By moving this weight up or down on the shank, or by substituting different weights, the stroke of the pendulum is regulated as desired. With the pendulum making its stroke at different speeds, the speed of the shutter movement is correspondingly varied.

With the construction described, each time the rod 107 is operated, the pendulum is allowed to make a single one-way stroke under gravity, and this stroke moves the shutter to carry the opening across the lens. As this occurs at approximately the maximum velocity of the pendulum, successive exposures are substantially uniform. After one exposure the shutter is automatically locked, this locking means being also gravity controlled. As a result, an effective shutter is obtained, which is rugged, compact and capable of variations of exposure.

Fig. 3 illustrates the use of the shutter and its operating means with a horizontal camera, that is, one having the lens axis horizontal instead of vertical. In this embodiment, the frame instead of having the vertical cylindrical support 37 is provided with a horizontal cylindrical support 150 which carries the sleeve-like mounting 30 in a horizontal position. Similarly, instead of the horizontal lens support 73 a vertical support 151 is carried by the frame, so that the lens mounting which is identical with that already described, except for its position, will hold the lens with its axis horizontal. The shutter and its operating mechanism are identical with the structure above described, except that there are provided supporting arms 152 formed so that the shutter moves through a vertical rather than a horizontal arc. In view of this motion, extending out from the pendulum on the side opposite the shutter is an arm 153 carrying a counterweight 154.

The operation of the shutter mechanism will be clear from the above description.

What is claimed is:

1. In combination, a photographic lens shutter, and gravity operated means for operating said shutter and to place the same in a position for subsequent operation.

2. In combination, a photographic lens shutter, gravity-operated means for opening and closing said shutter, and means for locking said shutter in closed position.

3. In combination, a photographic lens shutter, gravity-operated means for operating said shutter, means for locking said shutter in closed position, and means for releasing said locking means.

4. In combination, a photographic lens shutter having an opening arranged to move past the lens, and gravity operated means for operating said shutter to move said opening past the lens.

5. In combination, a photographic lens shutter having an opening arranged to move past the lens, gravity-operated means for operating said shutter to move said opening past the lens, and means for adjusting the speed of the shutter.

6. In combination, a photographic lens shutter, and a pendulum for operating said shutter.

7. In combination, a photographic lens shutter, a pendulum for operating said shutter, and means for locking said pendulum against operating movement.

8. In combination, a photographic lens shutter, a pendulum for operating said shutter, means for locking said pendulum against operating movement, and means for releasing said locking means.

9. In combination, a photographic lens shutter, a pendulum for operating said shutter, and means for automatically locking said pendulum against operating movement.

10. In combination, a photographic lens shutter, a pendulum for operating said shutter, and means for adjusting the speed of swing of said pendulum.

11. In combination, a photographic lens shutter movable across the lens, a pendulum for moving the shutter, said shutter having an opening arranged to pass the lens as the pendulum attains approximately its maximum velocity.

12. In combination, a photographic lens shutter movable across the lens, a pendulum for moving the shutter, said shutter having an opening arranged to pass the lens as the pendulum attains approximately its maximum velocity, and means for regulating the speed of swing of said pendulum.

13. In combination, a photographic lens shutter, a pendulum for operating said shutter, an operating rod carrying oppositely arranged arms for engaging a portion of the pendulum, means for holding the pendulum against operating movement when engaged by one of said arms, and means for tripping such arm upon operation of said rod to permit the pendulum to swing.

14. In combination, a photographic lens shutter, and a pendulum for operating said shutter, said pendulum including a plurality of weights the relative position of which is adjustable.

15. In combination, a photographic lens shutter, and a pendulum for operating the shutter, said pendulum including a shank and a weight slidable on said shank to adjust the speed of the pendulum.

16. In combination, a photographic lens shutter and a pendulum for operating the shutter, said pendulum including a movable weight.

17. In combination, a photographic lens shutter, a pendulum for operating said shutter, a controlling member, a stop thereon, weight arms pivotally mounted on said controlling member, a stop on the pendulum for engagement by said arms, a lug on each arm for alternately engaging said first mentioned stop, and stops for engagement by said controlling member.

18. In combination, a photographic lens shutter, a pendulum for operating said shutter, pendulum locking means including a part interposable in the path of the pendulum to hold the latter in a position ready to swing under the force of gravity when released, and means for tripping said locking means to release the pendulum.

19. In combination, a photographic lens shutter, a pendulum for operating said shutter, pendulum locking means including a gravity operated part interposable in the path of the pendulum to hold the latter in a position ready to swing under the force of gravity when released, and means for tripping said locking means to release the pendulum.

20. In combination, a photographic lens shutter having a regulable opening therein arranged to move past the lens, and a pendulum for operating said shutter to move the opening past the lens.

21. In combination, a photographic lens shutter having a regulable opening therein arranged to move past the lens, a pendulum for operating said shutter to move the opening past the lens, and means for regulating the speed of said pendulum.

22. In combination, a photographic lens shutter, a pendulum for operating said shutter, means for automatically locking said pendulum against operating movement at the end of each stroke, and means for releasing said locking means.

In testimony whereof, I have hereunto set my hand.

JOHN SWINSCOE.